(12) United States Patent
Shima et al.

(10) Patent No.: US 7,248,209 B2
(45) Date of Patent: Jul. 24, 2007

(54) RADAR APPARATUS

(75) Inventors: Nobukazu Shima, Kobe (JP); Osamu Isaji, Kobe (JP)

(73) Assignee: Fujitsu Ten Limited (JP)

( * ) Notice: Subject to any disclaimer, the term of this patent is extended or adjusted under 35 U.S.C. 154(b) by 229 days.

(21) Appl. No.: 11/146,329

(22) Filed: Jun. 6, 2005

(65) Prior Publication Data

US 2005/0275585 A1    Dec. 15, 2005

(30) Foreign Application Priority Data

Jun. 15, 2004  (JP)  ............................. 2004-176791

(51) Int. Cl.
   *G01S 7/40*   (2006.01)
(52) U.S. Cl. ...................... 342/173; 342/174
(58) Field of Classification Search ........ 342/173–174, 342/73
   See application file for complete search history.

(56) References Cited

U.S. PATENT DOCUMENTS

| | | | | |
|---|---|---|---|---|
| 3,623,107 | A * | 11/1971 | Holdren, III | 342/5 |
| 5,541,608 | A * | 7/1996 | Murphy et al. | 342/442 |
| 5,657,023 | A * | 8/1997 | Lewis et al. | 342/174 |
| 5,682,165 | A * | 10/1997 | Lewis et al. | 342/174 |
| 5,864,317 | A * | 1/1999 | Boe et al. | 342/374 |
| 6,133,868 | A * | 10/2000 | Butler et al. | 342/174 |
| 6,172,642 | B1 * | 1/2001 | DiDomenico et al. | 342/368 |
| 6,496,140 | B1 * | 12/2002 | Alastalo | 342/174 |
| 6,559,792 | B1 * | 5/2003 | Douglas et al. | 342/173 |
| 6,690,953 | B2 * | 2/2004 | Rexberg et al. | 455/562.1 |
| 6,747,595 | B2 * | 6/2004 | Hirabe | 342/174 |
| 6,809,685 | B2 * | 10/2004 | Hancock | 342/368 |
| 2003/0142012 | A1 * | 7/2003 | Hirabe | 342/173 |
| 2005/0219117 | A1 * | 10/2005 | Hiromori et al. | 342/165 |
| 2005/0275585 | A1 * | 12/2005 | Shima et al. | 342/174 |

FOREIGN PATENT DOCUMENTS

| | | |
|---|---|---|
| EP | 1058126 | 12/2000 |
| EP | 1074853 | 2/2001 |
| JP | 6-317654 | 11/1994 |
| JP | 2000-227474 | 8/2000 |
| JP | 2003-273634 | 9/2003 |
| JP | 2003-315445 | 11/2003 |
| JP | 2004-251837 | 9/2004 |
| JP | 2005-3393 | 1/2005 |

* cited by examiner

*Primary Examiner*—Thomas H. Tarcza
*Assistant Examiner*—Shelley Chen
(74) *Attorney, Agent, or Firm*—David N. Fogg; Fogg & Powers LLC

(57) ABSTRACT

The present invention relates to a radar apparatus that uses a plurality of transmitting/receiving antennas A1-A4 and receives a reflected wave, of a transmitted wave, reflected from a target. By utilizing the property that the path of the transmitted wave from an antenna A1 and its reflected wave and the path of the transmitted wave from the next selected antenna A2 and its reflected wave share the same spatial system, and therefore that both received signals have the same characteristics in terms of frequency and phase, a judgment is made as to whether there exists any difference between the receiving characteristics of the antennas, and the received signal is corrected in accordance with the result of the judgment. It is also possible to judge the presence or absence of a change in the characteristic of each antenna, and apply a correction accordingly, even during the normal operation of the apparatus.

18 Claims, 10 Drawing Sheets

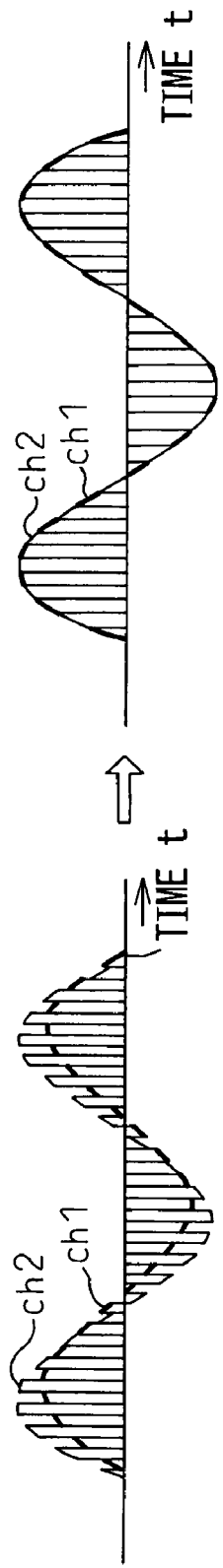
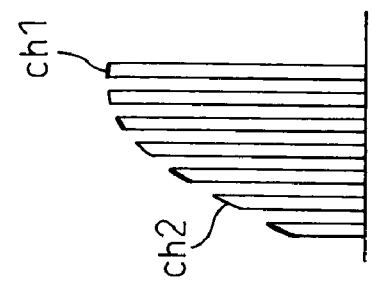
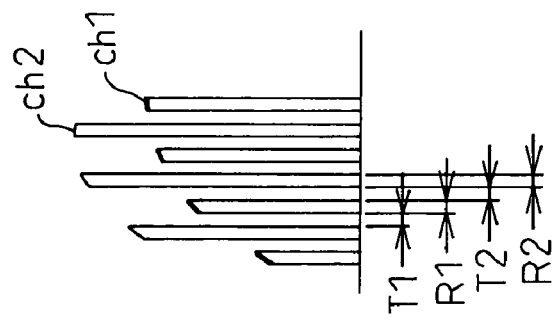

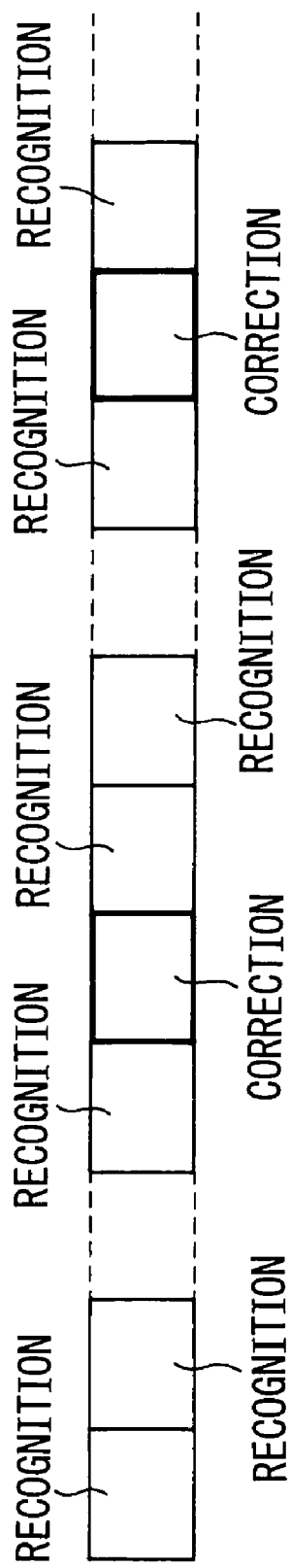

RADAR APPARATUS

CROSS-REFERENCE TO RELATED APPLICATION

This application claims the priority of Japanese Patent Application Number 2004-176791, filed on Jun. 15, 2004.

BACKGROUND OF THE INVENTION

1. Field of the Invention

The present invention relates to a radar apparatus equipped with a plurality of antennas each switchable between transmission and reception and, more particularly, to a radar apparatus that can accurately and quickly detect an antenna fault during normal operation, can easily make adjustments for changes in the receiving characteristics of each antenna, and can even make corrections, whenever necessary, for changes in characteristics occurring due to changes in ambient temperature.

2. Description of the Related Art

Traditionally, various kinds of radar apparatuses have been used to detect the azimuth, range, and velocity of a target. In recent years, radar apparatuses have come to be mounted on vehicles and used for such applications as collision warning, collision avoidance, automatic cruise control, and automatic driving. Such a radar is used to detect the azimuth, range, and velocity relative to a vehicle traveling ahead on the road.

One type of radar apparatus that can detect range as well as velocity is the frequency-modulated continuous-wave (FM-CW) radar apparatus. In this radar apparatus, a radio-wave is transmitted from a transmitting antenna, and a reflected wave returned from a target is received by a plurality of receiving antennas. As the plurality of receiving antennas are spatially separated from each other, the phase of the reflected wave from the same target differs between the receiving antennas. The azimuth to the target can be detected by detecting this phase difference.

Generally, triangular-wave frequency modulation is used for frequency modulation in the FM-CW radar apparatus. The triangular-wave frequency modulation refers to frequency modulation in which the modulating waveform alternates cyclically between a section where the frequency linearly increases and a section where the frequency linearly decreases. The range and velocity relative to the target are computed from the beat frequency in the modulating frequency increasing section (upsweep section) and the beat frequency in the modulating frequency decreasing section (downsweep section). Here, the azimuth to the target can be obtained by scanning an antenna beam narrowed to a prescribed width.

Generally, the methods for beam scanning can be broadly classified into two methods: mechanical scanning and electronic scanning. Digital beam forming (DBF) is one example of the electronic scanning method. The DBF scanning method uses an array antenna comprising a plurality of antennas as the receiving antennas. Antenna beam scanning is performed by using a DBF combining technique which can form an antenna beam in a desired direction by applying a phase-difference, through digital signal processing, to the beat signal obtained for each antenna and combining the results.

According to the DBF scanning method, there is no need to rotate the antennas as with the mechanical scanning method and, hence, the provision of a driving mechanism for rotating the antennas can be eliminated, thus offering the advantages of being resistant to vibration and being able to achieve size and weight reductions. Making use of these advantages, the development of radar apparatuses for automotive applications has been proceeding.

There has also been proposed a DBF radar apparatus that employs an array antenna comprising a plurality of transmit/receive common antennas, but not the array antenna configuration comprising a combination of a transmit-only antenna and a plurality of receiving antennas. This radar apparatus is constructed to radiate a transmit wave from a selected one of the antennas and receive the reflected waves by the other antennas, and provides more channels than there are antennas by sequentially switching from one antenna to another for transmission of the transmit wave. This enhances the directivity of the scanning beam in the DBF scanning method.

However, in the case of a DBF radar apparatus or the like that has a plurality of receiving antennas and performs azimuth detection by using phase information, phase shifts and variations in antenna gain among the antennas can occur due to performance differences among the plurality of antennas. As one approach to addressing this problem, it is practiced to eliminate performance variations by constructing the array antenna by selecting antennas having identical characteristics at the time of fabrication of the radar apparatus. However, this approach is costly as a measure to improve product quality.

Therefore, in another approach, if there exist performance differences among the plurality of antennas, it is practiced to adjust and correct phase shifts and antenna gain variations among the respective antenna channels before shipment from the factory. To correct the phase shift for each antenna channel, use is made, for example, of a reference signal generator, and a signal generated by the generator is transmitted from an adjusting antenna and received by each antenna element; then, using the result, phase correction is applied.

Further, in any radar apparatus that uses a plurality of antennas, a phase shift can occur on each antenna channel due to the deterioration of the antenna element over time, variations in ambient temperature, etc. If azimuth detection is performed without correcting such phase shift, detrimental effects will result, such as a disruption of the scanning direction profile of the combined result or an increase in sidelobe level, causing a degradation of the radar apparatus performance. Therefore, in a radar apparatus that detects azimuth based on phase, such phase shift must be corrected.

However, when using the above correcting means for the phase correction, the reference signal generator and the adjusting antenna must be provided in addition to the radar apparatus itself and, if these components are incorporated into the radar apparatus, not only the size but also the cost of the apparatus increases.

On the other hand, if these components are not incorporated, the phase correction can only be performed, for example, at the time of maintenance, because the above correcting means uses the principle such that the reference signal transmitted from the adjusting antenna is received directly by the receiving antenna and the phase shift is detected based on the received signal. Therefore, this has the problem that the phase correction cannot be performed during normal use of the radar apparatus.

Accordingly, it is an object of the present invention to provide a radar apparatus that eliminates the need for special correction equipment and can accurately and quickly judge, during normal operation, any change existing or occurring in the characteristics of each antenna and apply a correction in accordance with the result of the judgment, and that can be easily be adjusted in an initial setup at the factory before shipment and can even make corrections as needed for temperature variations due to environmental changes during operation, thereby ensuring high accuracy at all times.

SUMMARY OF THE INVENTION

To solve the above problems and to achieve the above object, according to the present invention, there is provided a radar apparatus comprising: a plurality of antennas, each switchable between transmission and reception; and signal processing unit for receiving a reflected wave of a transmitted radiowave reflected from a target object, and for generating a processing signal based on the received signal and thereby performing a recognition process which involves detecting an azimuth relating to the reflected wave or measuring a range or velocity relating to the target object, wherein when a reflected wave of a radiowave transmitted from a first selected one of the antennas is received by a second selected antenna, the signal processing unit generates a first processing signal based on the received signal, and when a reflected wave of a radiowave transmitted from the second selected antenna is received by the first selected antenna, the signal processing unit generates a second processing signal based on the received signal, and compares the first processing signal with the second processing signal and thereby makes a judgment about a change in a characteristic of the received signal based on an amplitude difference and/or a phase difference between the two processing signals.

The signal processing unit selects two antennas at a time from among the plurality of antennas, generates the first processing signal and the second processing signal relating to the two antennas each time the selection is made, and makes a judgment about a change in the characteristic of the received signal each time two antennas are selected; then, if it is judged that there exists a change in the characteristic of the received signal, the signal processing unit corrects the first processing signal or the second processing signal based on a correction value computed in accordance with the change.

The signal processing unit makes a judgment about a change in the characteristic of the received signal when a temperature change has occurred in an operating environment, or the signal processing unit makes a judgment about a change in the characteristic of the received signal in an intermittent manner during execution of the recognition process involving the azimuth detection and the range or velocity measurement.

During one period of a frequency modulation signal in the radiowave, the signal processing unit causes the second selected antenna to receive the reflected wave of the radiowave transmitted from the first selected antenna and generates the first processing signal based on the received signal, and during another period of the frequency modulation signal, the signal processing unit causes the first selected antenna to receive the reflected wave of the radiowave transmitted from the second selected antenna, generates the second processing signal based on the received signal, and compares the first processing signal with the second processing signal and thereby makes a judgment about a change in the characteristic of the received signal.

The signal processing unit divides one period of a frequency modulation signal in the radiowave into a plurality of sections in a time-division fashion wherein, in each section, the signal processing unit causes the second selected antenna to receive the reflected wave of the radiowave transmitted from the first selected antenna and generates the first processing signal based on the received signal, and then causes the first selected antenna to receive the reflected wave of the radiowave transmitted from the second selected antenna, generates the second processing signal based on the received signal, and compares the first processing signal with the second processing signal and thereby makes a judgment about a change in the characteristic of the received signal.

The signal processing unit makes a judgment about a change in the characteristic of the received signal when the range relative to the target object remains unchanged, or when the vehicle equipped with the radar apparatus is detected as being stationary, or when the received signal has a level higher than a predetermined value or lying within a predetermined range.

The signal processing unit stores the computed correction value in association with the receiving antenna, and performs the recognition process in accordance of the processing signal generated based on the received signal received by the receiving antenna and corrected by the correction value.

When a plurality of target objects are detected, the signal processing unit makes a judgment about a change in the characteristic of the received signal, based on the first and the second processing signal generated from the received signals representing the reflected waves returned from the target object located closest to the radar apparatus.

The signal processing unit makes a judgment about a change in the characteristic of the received signal in response to an external instruction; further, the signal processing unit makes a judgment about a change in the characteristic of the received signal as an initial adjustment of the radar apparatus and, if the presence of a change in the characteristic is detected, then stores the computed correction value in association with the receiving antenna.

The signal processing unit outputs a notification outside the radar apparatus when it is judged that there exists a change in the characteristic of the received signal; further, when it is judged that there exists a change in the characteristic of the received signal, if the change in the characteristic is not within a predetermined range, the signal processing unit outputs dialog information outside the radar apparatus.

In the above radar apparatus, the signal processing unit generates the first processing signal by performing a fast Fourier transform after converting the received signal received by the second selected antenna into a digital signal, generates the second processing signal by performing a fast Fourier transform after converting the received signal received by the first selected antenna into a digital signal, and compares frequency components corresponding to the target object and contained in the first processing signal and the second processing signal, respectively, to make a judgment about a change in the characteristic of the received signal based on an amount of amplitude difference and/or phase difference between the frequency components; further, when it is judged that there exists a change in the characteristic of the received signal, the signal processing unit corrects the first processing signal or the second processing signal based on the correction value computed in accordance with the change.

As described above, according to the radar apparatus of the present invention, as there is no need to provide special correction equipment, and as any change existing or occurring in the characteristics of each antenna in the array antenna can be accurately and quickly judged during normal operation and a correction can be applied to the received signal in accordance with the result of the judgment, variations in received signal characteristics due to performance differences between the respective antennas can be easily corrected in initial setup at the factory before shipment, and corrections can even be made, as needed, for temperature variations due to environmental changes during operation, thereby ensuring high accuracy at all times.

Furthermore, according to the radar apparatus of the present invention, if, initially, there exists a performance difference between each antenna of the array antenna, or if the antenna characteristics degrade due to the deterioration of the antenna over time, or an antenna fault occurs during the operation of the radar apparatus, corrections can be made in accordance with the change in the antenna characteristics, etc., so that the accuracy of the recognition operation of the radar apparatus can be maintained at a high level at all times.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 6A to 6C are diagrams for explaining the waveforms of received signals on two channels in the timing example shown in FIG. 5;

FIG. 7 is a diagram for explaining timing when performing processing to judge a change in received signal characteristic in an intermittent manner in the radar apparatus of the embodiment;

DESCRIPTION OF THE PREFERRED EMBODIMENTS

For a better understanding of the effect to be achieved by the present invention, first the principle for measuring the range, velocity, and azimuth of a target in a previously proposed radar apparatus and the system configuration implementing it will be described in detail below.

The range from the radar apparatus to the target is denoted by R0, the spacing between two receiving antennas by L, and the azimuth angle to the target by $\theta$. Then, the ranges R1 and R2 from the respective receiving antennas to the target are $$R1 = R0 + (L/2) \cdot \sin\theta$$

$$R2 = R0 - (L/2) \cdot \sin\theta$$

The phase difference $\Delta\phi$ between the received signals at the respective receiving antennas is $$\Delta\phi = (L/\lambda) \cdot \sin\theta$$

where $\lambda$ is the wavelength of the received signals. Hence, the azimuth angle $\theta$ to the target is $$\theta = \sin^{-1}\{(\lambda/L) \cdot \Delta\phi\}$$

Thus, the azimuth to the target is obtained from the phase difference between the received signals.

On the other hand, an FM-CW radar apparatus is one that detects target range and velocity by using a continuous wave. When the FM-CW radar apparatus is combined with a phase monopulse radar apparatus, the range, velocity, and azimuth of the target can be obtained.

The FM-CW radar apparatus applies FM modulation to a continuous wave transmit signal. For example, the transmit signal is frequency-modulated by a triangular wave. The modulated transmit signal has a waveform that alternates cyclically between increasing and decreasing. When this transmit signal is radiated from a transmitting antenna, and a reflection from a stationary target is received by a receiving antenna, the transmitted triangular wave and the received triangular wave are shifted in time because a finite amount of time passes between the transmission and the reception. However, the amplitude remains unchanged because the relative velocity of the target is zero. Here, when the received wave is heterodyned with a reference wave (the transmitted wave), a beat signal is produced that has a frequency component equal to the difference between the transmit frequency and the receive frequency.

Propagation delay time $\tau$ is the time that elapses until the transmitted wave is received, and represents the time shift stated above. When the relative range to the target is denoted by R, and the velocity of light by c, then the propagation delay time $\tau$ is given as $\tau = 2R/c$. Further, when the repetition frequency of FM, i.e., the frequency of the triangular wave, is denoted by fm, and the frequency deviation width of FM (the range over which the reference frequency is modulated) by $\Delta f$, the beat frequency fr is expressed as $$fr = 4R \cdot fm \cdot \Delta f / c$$

Thus, the relative range R to the target can be detected by obtaining the beat frequency fr from the produced beat signal.

Figure 10:
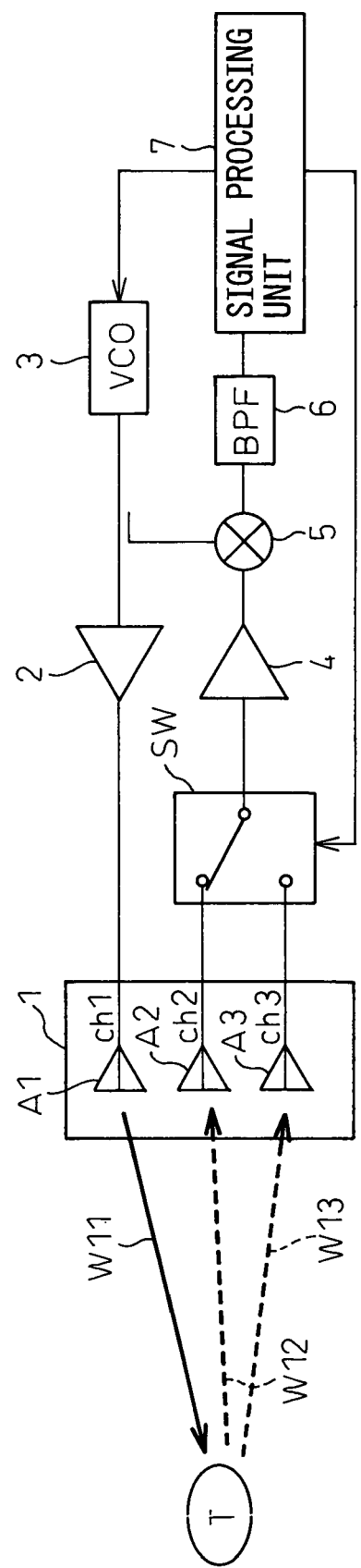
FIG. 10 is a diagram for explaining the system configuration of a radar apparatus according to the prior art.

The system configuration of an FM-CW radar apparatus that can detect the relative range and relative velocity of a target as well as the azimuth to the target is shown in FIG. 10. FIG. 10 shows in simplified form one configuration example of the FM-CW radar apparatus according to the prior art which uses separate antennas for transmission and reception.

The radar apparatus shown in FIG. 10 comprises an array antenna 1 containing a plurality of antennas A1 to A3, amplifiers 2 and 4, a voltage-controlled oscillator (VCO) 3, an RF mixer 5, a band-pass filter (BPF) 6, and a signal processing means 7. In the example of FIG. 10, of the plurality of antennas A1 to A3, the antenna A1 is for transmission only and the antennas A2 and A3 are for reception only, forming two receiving channels.

A millimeter wave signal generated by the voltage-controlled oscillator 3 is frequency-modulated by a modulating signal from a modulating signal generator contained in the signal processing means 7. Generally, for the modulating signal, a triangular wave signal is often used; the transmit wave W11 frequency-modulated by the triangular wave is radiated from the transmitting antenna A1 toward the target T located ahead. A reflected wave W12 from the target T ahead is received by the receiving antenna A2. Next, the selector switch SW is switched to the channel of the receiving antenna A3, and the transmit wave W11 is radiated from the transmitting antenna A1. Then, a reflected wave W13 from the target is received by the receiving antenna A3.

The RF mixer 5 mixes each of the successively received signals with a portion of the transmitted signal, and outputs a beat signal. Each beat signal thus produced is passed through the baseband pass filter 6 and fed to the signal processing means 7. The signal processing means 7 has an analog-to-digital (AD) conversion function and a fast Fourier transform (FFT) function, and computes the relative range and relative velocity of the target T ahead by extracting, using the above functions, the frequency information contained in the beat signal. The radar apparatus of FIG. 10 is shown by focusing on the configuration for computing the relative range and relative velocity of the target T, but it will be recognized that the signal processing means 7 can also detect the azimuth angle of the reflected wave based on the transmitted signal and the received signal.

In the case of the DBF radar apparatus, etc. described above, as a plurality of antennas are used as the receiving antennas, and azimuth detection is performed by using the received phase information, phase shifts and variations in antenna gain among the antennas can occur due to performance differences among the plurality of antennas. Such phase shifts and variations in antenna gain affect the accuracy of range and azimuth detection.

Further, in any radar apparatus that uses a plurality of antennas, a phase shift can occur on each antenna channel due to the deterioration of the antenna element over time, variations in ambient temperature, etc. If azimuth detection is performed without correcting such phase shift, detrimental effects will result, such as a disruption of the scanning direction profile of the combined result or an increase in sidelobe level, causing a degradation of the radar apparatus performance.

In view of this, in the radar apparatus of the present invention, provisions are made to eliminate the need for special correction equipment so that any changes occurring during normal operation in the characteristics of any one of the antennas can be accurately and quickly corrected for in the azimuth detection process performed based on the received signal, and so that initial adjustments can be easily made at the factory before shipment, while also making it possible to apply corrections as needed for temperature variations due to environmental changes during operation, thereby maintaining high accuracy at all times.

Next, embodiments of the radar apparatus of the present invention incorporating the above correction features will be described with reference to FIGS. 1 to 9.

Figure 1:
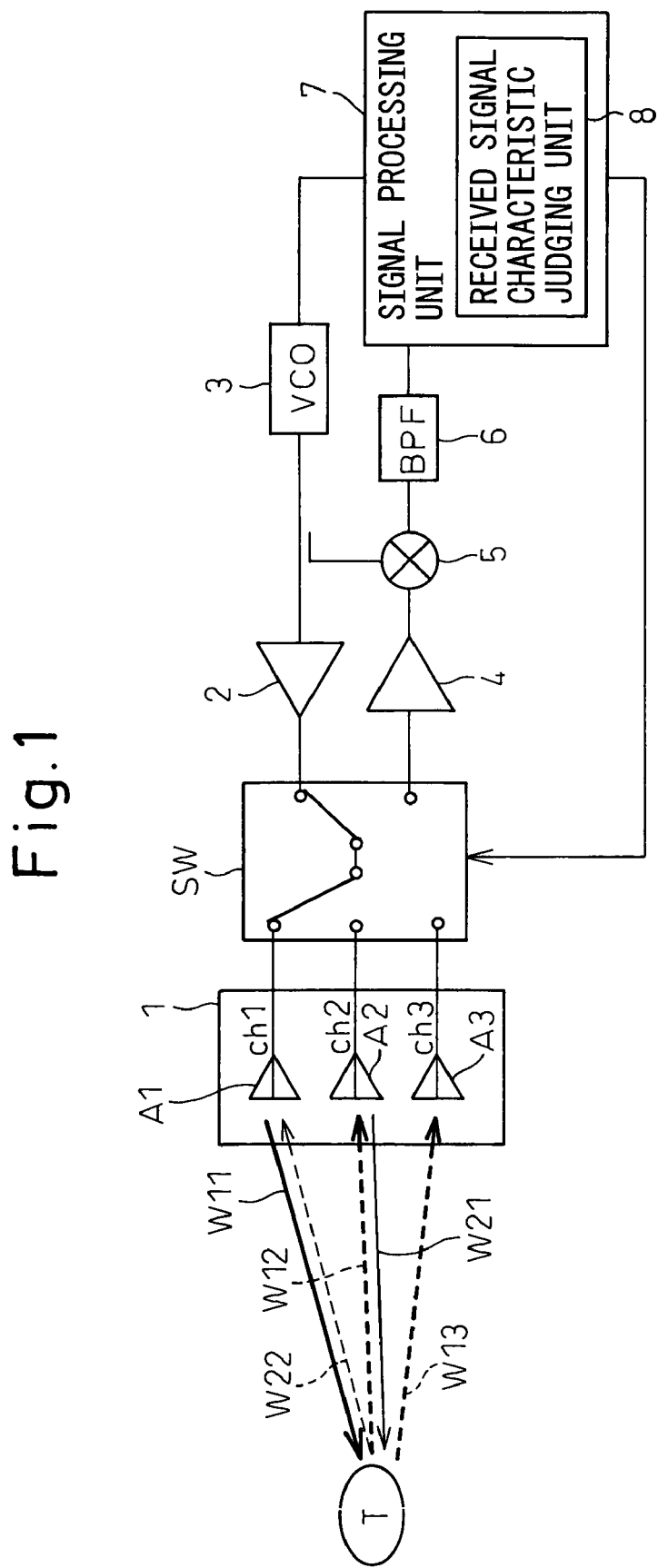
FIG. 1 is a diagram for explaining the system configuration of a radar apparatus according to one embodiment of the present invention.

FIG. 1 shows, in simplified form, the system configuration of the radar apparatus according to one embodiment of the present invention. As the radar apparatus of FIG. 1 is based on the system configuration of the FM-CW radar apparatus shown in FIG. 10, the same parts are designated by the same reference numerals.

The radar apparatus of this embodiment comprises an array antenna 1 containing a plurality of antennas A1 to A3, amplifiers 2 and 4, a voltage-controlled oscillator (VCO) 3, an RF mixer 5, a band-pass filter (BPF) 6, and a signal processing unit 7. In the example of FIG. 1, all of the plurality of antennas A1 to A3 are used for both transmission and reception. In the prior art radar apparatus shown in FIG. 10, on the other hand, the antenna A1 was for transmission only and the antennas A2 and A3 were for reception only.

Accordingly, the way in which the antennas are switched for connection in the selector SW is different from that in the selector switch SW in FIG. 10. Switching between transmission and reception in the array antenna 1 is accomplished by the switching operation of the selector switch SW which is controlled by a switching instruction from the signal processing unit 7. In the example of the radar apparatus shown in FIG. 1, the array antenna 1 is constructed from three antennas A1 to A3, but the number of antennas is not limited to three but may be increased to achieve a larger number of channels.

A millimeter wave signal generated by the voltage-controlled oscillator 3 is frequency-modulated by a triangular modulating signal from a modulating signal generator contained in the signal processing unit 7. In the example shown in FIG. 1, first the selector switch SW is controlled to select channels ch1 and ch2, and the triangular frequency-modulated transmit wave from the amplifier 2 is fed to the antenna A1. The transmit wave W11 frequency-modulated by the triangular wave is radiated from the antenna A1 toward the target T located ahead. Thereupon, the selector switch SW is controlled so that the reflected wave W12 from the target T ahead is received by the antenna A2.

The RF mixer 5 mixes the received signal with a portion of the transmitted signal, and outputs a beat signal. The beat signal is passed through the band-pass filter 6 and fed to the signal processing unit 7. The signal processing unit 7 computes the relative range and relative velocity of the target T located ahead by using the frequency information contained in the beat signal.

Further, in the radar apparatus of FIG. 1, to perform DBF scanning the following two antennas are selected from among the plurality of antennas by controlling the selector switch SW. For example, channels ch1 and ch3 are selected so that the antenna A1 is selected for transmission and the antenna A3 for reception. The transmit wave W11 is transmitted from the antenna A1. The reflected wave W13 from the target T is received by the antenna A3. By acquiring these signals simultaneously in time, the signals after beat production can be combined for DBF in the signal processing unit 7.

The above operation is commonly performed in any known DBF radar apparatus. In the radiowave transmission and reception of the radar apparatus described above, when the target T is located ahead of the radar apparatus, the transmitted wave W11 transmitted from the antenna A1 on channel ch1, for example, is received as the reflected wave W12 by the antenna A2 on channel ch2. On the other hand, the transmitted wave W21 transmitted from the antenna A2 on channel ch2 is received as the reflected wave W22 by the antenna A1 on channel ch1.

Here, the path of the transmitted wave W11 and its reflected wave W12 and the path of the transmitted wave W21 and its reflected wave W22 belong to the same spatial system; therefore, if the received signal of the reflected wave W12 and the received signal of the reflected wave W22 are acquired simultaneously in time, then these signals have the same characteristics in terms of frequency and phase.

Therefore, in this embodiment, attention is paid to the fact that, if the paths of the transmitted and reflected waves pass through the same spatial system, all the received signals have the same characteristics. In view of this, the system is configured to be able to detect differences between the characteristics of the respective antennas forming the array antenna and judge the presence or absence of variations in characteristics among the antennas, with further provisions made to correct for differences in the characteristics during the received signal processing. This correction serves to enhance the accuracy of the recognition process performed in the signal processing unit 7 for such operations as azimuth detection by DBF combining or measurement of the relative velocity or relative range of the target.

According to this technique, by making every antenna in the array antenna switchable between transmission and reception, and by just incorporating a received signal characteristic judging unit 8 in the signal processing unit 7, it becomes possible to judge a change in the characteristics of each antenna, as needed, without specifically changing the system configuration of the prior art radar apparatus and without specifically providing a correction means comprising a reference signal generator and an adjusting antenna as in the prior art configuration.

The radar apparatus of this embodiment shown in FIG. 1 differs from the prior art radar apparatus configuration shown in FIG. 10 in that the selector switch SW is configured to be able to switch every antenna between transmission and reception and, when performing the characteristic change judging process, the received signal characteristic judging unit 8 controls the selector switch SW.

If, initially, there exists a performance difference between each antenna of the array antenna, the antenna can be corrected as needed. Therefore, each antenna can be corrected in the initial adjustment work before the radar apparatus is shipped from the factory. Furthermore, corrections can also be made to cope with such situations as the deterioration of the antenna characteristics due to aging, the occurrence of an antenna fault during the operation of the radar apparatus, and variations in the antenna characteristics due to temperature variations associated with changes in the environment of the radar apparatus.

Figure 2:
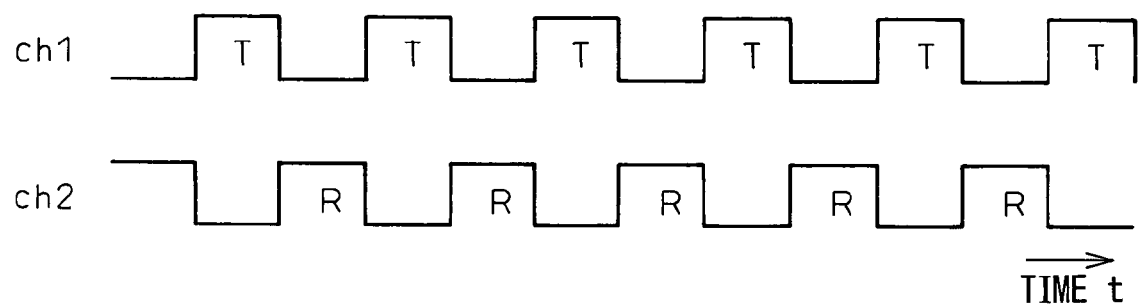
FIG. 2 is a diagram for explaining an example of timing between radiowave transmission and reflected wave reception when performing processing to judge a change in received signal characteristic in the radar apparatus of the embodiment.

FIG. 2 shows an example of timing between radiowave transmission and reflected wave reception when performing the received signal characteristic change judging process according to the present embodiment. The timing example here shows the transmission timing for the transmit wave W11 to be transmitted from the antenna A1 on channel ch1 shown in FIG. 1 and the reception timing for the reflected wave W12 to be received by the antenna A2 on channel ch2.

In the timing example shown here, in response to an external instruction given at the time of factory adjustment, or to a prescribed instruction periodically issued during the operation of the radar apparatus, the received signal characteristic judging unit 8 controls the selector switch SW so that the transmit wave W11 is radiated from the antenna A1 for the duration of the transmit period T. After the period T, the selector switch SW is controlled so that the reflected wave W12 from the target is received by the antenna A2 for the duration of the receive period R, and the transmit period T and the receive period R are repeated alternately a predetermined number of times. If the transmission and reception is performed only once, a stable received signal, on which to judge a change in the characteristic, may not be obtained; therefore, to increase the accuracy, the transmission and reception is repeated a predetermined number of times so that a change in the characteristic can be judged based on a plurality of received signals.

Though not shown in FIG. 2, the received signal characteristic judging unit 8 thereafter controls the selector switch SW to switch the transmission/reception between channel ch1 and channel ch2 so that the transmit wave W21 is transmitted from the antenna A2 and the reflected wave W22 is received by the antenna A1, the transmit period T and the receive period R being repeated alternately in the same manner as described above. According to this procedure, the path of the transmitted wave W11 and its reflected wave W12 and the path of the transmitted wave W12 and its reflected wave W22 share the same spatial system existing between the radar apparatus and the target.

To share the same spatial system, it is desirable, for example, in the case of the FM-CW radar apparatus employing triangular frequency modulation, that the transmission and reception of the transmit wave W11 and the received wave W12 on channels ch1 and ch2 be performed repeatedly during the upsweep section of one of the contiguous triangular waves of the frequency modulation signal, and that the transmission and reception of the transmit wave W21 and the received wave W22 on channels ch2 and ch1 be performed repeatedly during the same upsweep section. From the standpoint of sharing the same spatial system, it is preferable that the formation of the path of the transmitted wave W11 and its reflected wave W12 and the formation of the path of the transmitted wave W12 and its reflected wave W22 are not separated in time. Here, instead of the upsweep section, the downsweep section of one of the contiguous triangular waves of the frequency modulation signal may be used.

Figure 3:
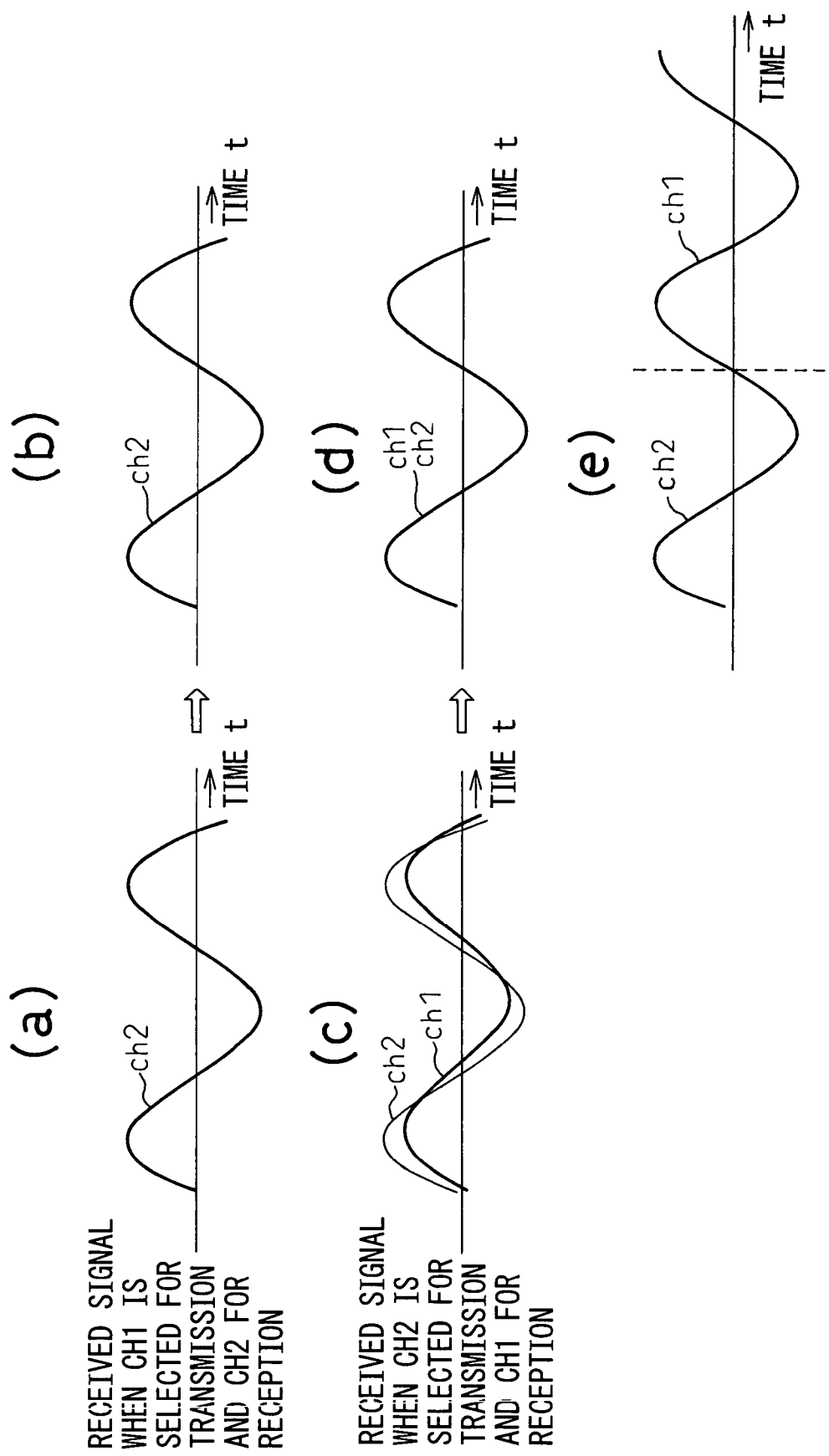
FIG. 3 is a diagram for explaining how a correction is made for a change in the received signal characteristic when the received signal characteristic changes between two channels.

Next, how the received signal characteristic judging means 8 judges a change in the antenna characteristic will be conceptually described with reference to the received signal waveforms shown in FIG. 3. In FIG. 3, the waveform of the received signal when the signal is transmitted from channel ch1 and received on channel ch2 is shown in (a) and (b), and the waveform of the received signal when the signal is transmitted from channel ch2 and received on channel ch1 is shown in (c) and (d).

Parts (a) and (c) of FIG. 3 each schematically show the waveform of the received signal as it is received, while (c) and (d) of FIG. 3 each schematically show the waveform after correction. The waveform shown in each of (a) and (c) of FIG. 3 is the waveform after being processed through the band-pass filter 6, i.e., the received signal waveform supplied to the received signal characteristic judging unit 8. The example shown here assumes the presence of a single target.

When the received signal representing the reflected wave W12 received at the antenna A2 is input as shown by "ch2" in part (a) of FIG. 3, the received signal characteristic judging unit 8 takes it as the reference signal for the received signal, as shown by "ch2" in part (b) of FIG. 3. Next, when the selector switch SW is controlled to switch the transmission/reception between channels ch1 and ch2, the received signal representing the reflected wave W22 received at the antenna A1 is input to the received signal characteristic judging unit 8, as shown by "ch1" in part (c) of FIG. 3.

Here, if there is a difference in receiving performance between the antenna A1 and the antenna A2, the waveform of the received signal "ch1", shown by a thick line in part (c) of FIG. 3, becomes displaced from the waveform of the received signal "ch2", shown by a thin line. Though the received signal "ch2" and the received signal "ch1" are not input simultaneously in time, in part (c) of FIG. 3 the waveform of one received signal is displaced in time and superimposed on the other for ease of comparison. It can be seen that the received signal "ch1" is reduced in amplitude and shifted in phase compared with the received channel "ch2".

The presence of such amplitude and phase differences may indicate that, from the beginning, there has been a difference in antenna receiving characteristic between the two antennas, or that the receiving performance has changed due to the deterioration of the antenna over time. Further, the presence of such differences may indicate that the receiving performance has changed as the temperature characteristic is affected by changes in ambient temperature, or that an abnormality, such as a fault, has occurred to the antenna element itself.

If a phase detecting means commonly used when performing recognition in the signal processing means 7 is included in the received signal characteristic judging unit 8, the phase shift can also be detected in the received signal characteristic judging process. By comparing the received signal "ch1" with the received signal "ch2", it can be judged that there exists a change in the characteristic of the received signal. Then, a computation for correcting the antenna gain and phase shift is performed for the antenna A1, and the result is stored as the correction value associated with the antenna A1. This correction procedure is sequentially performed for combinations with other antennas.

As shown in part (d) of FIG. 3, by correcting the received signal "ch1" by the correction value, the waveform of the received signal "ch1" becomes identical to that of the received signal "ch2". In part (d) of FIG. 3 also, because the received signal "ch2" and the received signal "ch1" are not input simultaneously in time, the waveform of one received signal is displaced in time and superimposed on the other for ease of comparison. As a result, the corrected waveform of the received signal "ch1" is shown perfectly superimposed on the waveform of the received signal "ch2".

The actual relationship between the received signal "ch2" and the received signal "ch1" corrected by the correction value is shown in part (e) of FIG. 3. From part (d) of FIG. 3, it can be seen how the antenna gain is corrected, but it is difficult to see how the phase is corrected. In part (e) of FIG. 3 in which the transmission/reception switching timing is indicated by a dashed line, as the received signal "ch2" and the received signal "ch1" are not input simultaneously in time, the received signal "ch2" and the corrected received signal "ch1" which are identical in waveform are connected continuously at the switching timing point, thus showing that any disruption that could occur at the switching timing point is eliminated by the phase correction.

Accordingly, whether the phase difference is one that has been present from the beginning between the antennas or one that has developed during operation, in the subsequent processing the received signal received at the antenna A1 is corrected in accordance with the stored correction value. As a result, the performance difference between the antennas is resolved for the recognition process. For the other antennas, similar corrections are applied, and signals unaffected by the performance difference and having identical characteristics can thus be obtained.

Next, referring to the flowchart shown in FIG. 4, a description will be given of the actual correction procedure that the received signal characteristic judging unit 8 in the signal processing unit 7 performs, in accordance with the method so far described, which resolves the performance difference between the antennas by judging the difference in receiving signal characteristic between the antennas.

Figure 4:
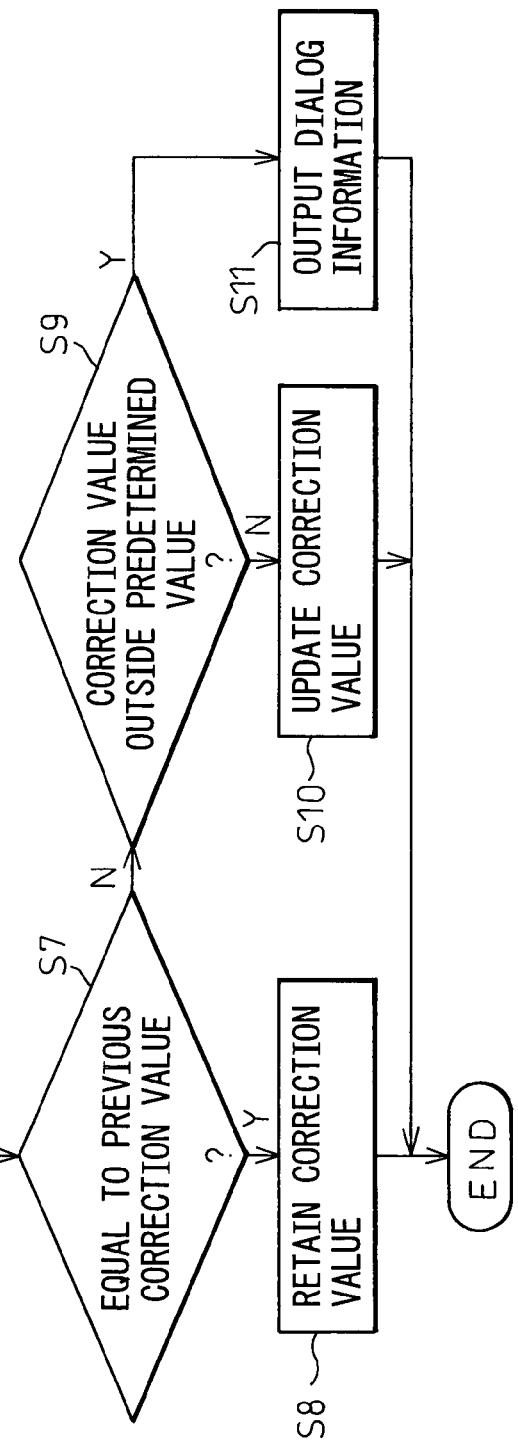
FIG. 4 is a flowchart for explaining a procedure for performing processing to judge a change in received signal characteristic in the radar apparatus of the embodiment.

The correction procedure shown in FIG. 4 is described by taking as an example the case of the transmission and reception performed using the two antennas shown in FIG. 3. First, when the received signal "ch2" shown in part (a) of FIG. 3 is input to the signal processing unit 7 via the band-bass filter 6, the received signal characteristic judging unit 8 causes the received signal "ch2" to be converted into a digital signal (step S1). Then, an FFT is applied (step S2). These operations are the same as those performed in a known recognition process.

When the transmission is switched from channel ch1 to channel ch2 by the selector switch SW under control of the received signal characteristic judging unit 8, the received signal "ch1" shown in part (c) of FIG. 3 is input to the signal processing unit 7 via the band-bass filter 6. At this time, the received signal characteristic judging unit 8 causes the received signal "ch1" to be converted into a digital signal (step S3), then an FFT is applied (step S4). When the FFT is applied to the received signal, the frequency component due to the target range is extracted, and a peak occurs at the position of that frequency component.

In this way, the frequency component due to the target range associated with the received signal "ch2" is extracted in step S2, and the frequency component due to the target range associated with the received signal "ch1" is extracted in step S4; then, the received signal characteristic judging unit 8 compares the phases and amplitudes of these frequency components (step S5). Here, the amplitude of the frequency component refers to the peak value occurring at the position of that frequency component.

When the frequency component associated with the received signal "ch1" is compared with the frequency component associated with the received signal "ch2" in step S5, if there is a difference in amplitude and/or phase between them, the amount of difference is computed, and the thus computed amount of difference is taken as the correction value for channel ch1 (step S6).

Next, it is determined whether the correction value obtained in the present cycle of the correction procedure is equal to the correction value obtained and stored in the previous cycle of the correction procedure (step S7). If the present correction value is equal to the previous correction value (Y in step S7), the performance difference may be due to manufacturing variations, or that the deterioration of the antenna performance has little progressed; therefore, the previous correction value is retained (step S8).

If the present correction value differs from the previous correction value (N in step S7), it is determined whether the magnitude of the present correction value is outside a predetermined range or not (step S9). If the magnitude of the present correction value is not outside the predetermined range (N in step S9), the probability is that the deterioration of the antenna performance has progressed, or that the antenna performance has changed due to changes in the temperature of the operating environment; therefore, the correction value is updated by replacing the previous correction value with the present correction value (step S10). Here, when updating the value, a notification that the performance of the antenna has changed may be output outside the apparatus.

On the other hand, if it is determined that the magnitude of the present correction value is outside the predetermined range (Y in step S9), this means that the antenna is in an abnormal receiving condition, which can have serious effects on the recognition operations in the signal processing unit 7; in this case, dialog information is output to indicate that an antenna fault has occurred (step S11).

As described above, the received signal characteristic judging unit 8 combines the transmission channel ch1 with the receiving channel ch2 and the transmission channel ch2 with the receiving channel ch1 by controlling the selector switch SW and, if a change is detected in the receiving performance of the antenna A1, the corresponding received signal is corrected so that the change does not affect the usual recognition process, by using the correction value obtained for the antenna based on the frequency components associated with the received signals "ch1" and "ch2".

When the above correction procedure is performed by sequentially selecting combinations of two channels from the plurality of antennas forming the array antenna 1, the performance difference between the respective antennas can be judged, and a correction value appropriate to each individual antenna can be obtained; by applying corrections using these correction values, differences between the characteristics of the respective channels in the usual recognition process can be eliminated.

The correction procedure for the respective received signals has been shown above with reference to the flowchart of FIG. 4 by taking as an example the case where the two antennas A1 and A2 are selected and switching is made between channel ch1 and channel ch2. Next, a specific example of how each correction value is calculated in the above correction procedure will be described below by likewise referring to the case where switching is made between channel ch1 and channel ch2.

In steps S1 and S3 in FIG. 4, the AD-converted received signals of channel ch1 and channel ch2 are denoted by $E_1(t)$ and $E_2(t)$, respectively, and it is assumed that each received signal is obtained only from the reflected wave returned from a known target; then, the respective received signals are expressed as $$E_1(t) = C_1 \cdot e^{-j2\pi ft} = C_1 \cdot e^{-j\theta_1(t)}$$

$$E_2(t) = C_2 \cdot e^{-j(2\pi ft - \delta)} = C_2 \cdot e^{-j\theta_2(t)}$$

where $C_1$ and $C_2$ represent the amplitudes, and $\theta_1(t)$ and $\theta_2(t)$ the phases. Here, $\theta_2(t) = 2\pi ft - \delta$, which indicates that the received signal $E_2(t)$ has a phase shift $\delta$ with respect to the received signal $E_1(t)$.

It is assumed here that, when the earlier described correction is not applied, the amplitudes and phases of the normally received signals have the relations $C_1 \neq C_2$ and $\theta_1 \neq \theta_2$, respectively. On the other hand, when the transmission and reception on the two antennas are fixed to the channels ch1 and ch2, since the received signal obtained from the reflected wave returned by the same path is input to the AD converter, the relations $C_1 = C_2$ and $\theta_1 = \theta_2$ hold, so that the received signals of channel ch1 and channel ch2 should be identical to each other.

By utilizing this principle, the received signals "ch1" and "ch2" are corrected as shown below; that is, when the amplitude correction value is denoted by k and the phase shift correction value by $\delta$, the amplitudes $C_1$ and $C_2$ and the phases $\theta_1$ and $\theta_2$ are respectively related by $$C_1 = kC_2 \text{ and}$$

$$\theta_1 = \theta_2 + \delta$$

Then, when the corrected received signal of channel ch2 is denoted by $E_2'(t)$, $E_2'(t)$ is given by $$E_2'(t) = kC_2 \cdot e^{-j\{\theta_2(t) + \delta\}}$$

Here, from the above relations $C_1 = kC_2$ and $\theta_1 = \theta_2 + \delta$, $E_2'(t)$ can be expressed as $$E_2'(t) \approx C_1 \cdot e^{-j2\pi ft}$$

$$= E_1$$

This means that the received signal of channel ch2 has been corrected by the correction values k and $\delta$ so that it becomes identical to the received signal of channel ch1.

In this way, either one of the received signals on the two channels is corrected based on the correction values k and $\delta$ by reference to the other received signal. Then, in steps S2 and S4 in the flowchart of FIG. 4, the FFT is applied to each AD-converted received signal, and in step S5, the amplitude values $C_1$ and $C_2$ and the phase values $\theta_1$ and $\theta_2$ are computed from the results of the FFTs by finding the real and imaginary roots of the frequency associated with the distance/position of the known target.

Once the amplitude values $C_1$ and $C_2$ and the phase values $\theta_1$ and $\theta_2$ are computed, the correction values k and $\delta$ for the channels ch1 and ch2 can be obtained from the relations $C_1 = kC_2$ and $\theta_1 = \theta_2 + \delta$, respectively.

The above description has been given by dealing with the case where the correction values k and $\delta$ for the channels ch1 and ch2 are obtained, but when the array antenna 1 comprises three antennas A1 to A3, as in the radar apparatus shown in FIG. 1, transmission and reception are further performed by selecting the antennas A1 and A3, and the correction values k and $\delta$ for the channels ch1 and ch3 are obtained based on the received signals. Further, in the case of a multi-channel radar apparatus equipped with a larger number of antennas, combinations of two channels are sequentially selected by combining the reference channel, for example, channel ch1, with another channel selected from among the plurality of antennas, and the correction values k and $\delta$ are obtained for each two-channel combination.

Next, referring to FIG. 5, a description will be given of another example of timing between radiowave transmission and reflected wave reception when performing the received signal characteristic change judging process. To share the same spatial system when repeating the radiowave transmission and reflected wave reception, in the timing example of radiowave transmission and reflected wave reception previously shown in FIG. 2 for the case of the FM-CW radar apparatus employing triangular frequency modulation, provisions have been made, for example, in the case of channel ch1 and channel ch2, so that the transmission of the transmit wave W11 from channel ch1 and the reception of the reflected wave W12 on channel ch2 are performed repeatedly during one upsweep section of the triangular frequency modulation signal, and so that the transmission of the transmit wave W21 from channel ch2 and the reception of the reflected wave W22 on channel ch1 are performed repeatedly during the same upsweep section.

However, in the timing example of radiowave transmission and reflected wave reception shown in FIG. 2, the timing for forming the path of the transmitted wave W11 and its reflected wave W12 and the timing for forming the path of the transmitted wave W21 and its reflected wave W22, which are accomplished by switching the transmission/reception between channel ch1 and channel ch2, are separated in time from each other. In contrast, in the timing example shown in FIG. 5, the formation of the respective paths is performed repeatedly in time division fashion. The timings for forming the respective paths of the transmitted and received waves by switching the transmission/reception between channel ch1 and channel ch2 are made as close as possible to each other so that the respective paths share the same spatial system.

Figure 5:
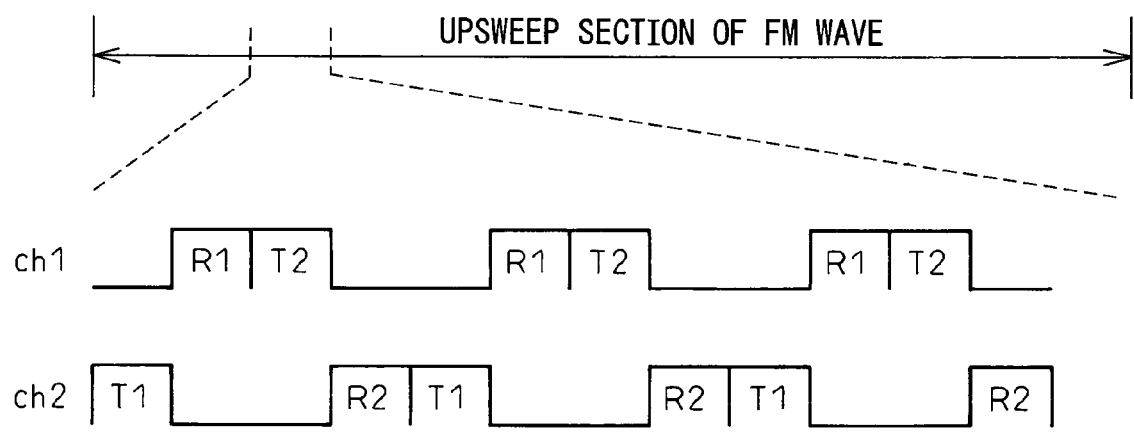
FIG. 5 is a diagram for explaining another example of timing between radiowave transmission and reflected wave reception when performing processing to judge a change in received signal characteristics in the radar apparatus of the embodiment.

As shown in FIG. 5, when performing the received signal characteristic change judging process, the formation of the paths for the radiowave transmission and reflected wave reception between the two channels is performed over one entire upsweep section of the triangular frequency modulation signal. In FIG. 5, to explain the path formation timings in an easy-to-understand manner, a portion of the one upsweep section is enlarged as indicated by dashed lines to show how the transmission and reception on channels ch1 and ch2 are performed repeatedly.

In the timing example of radiowave transmission and reflected wave reception shown in FIG. 5, when performing the received signal characteristic change judging process, the transmission/reception timing for the antenna A1 on channel ch1 and the antenna A2 on channel ch2 shown in FIG. 1 is shown as a representative example. T1 indicates the period during which the transmit wave W21 is transmitted from the antenna A1 on channel ch2, R1 indicates the period during which the receive wave W22 is received by the antenna A2 on channel ch2, T2 indicates the period during which the transmit wave W11 is transmitted from the antenna A1 on channel ch1, and R2 indicates the period during which the receive wave W12 is received by the antenna A2 on channel ch2.

First, the received signal characteristic judging unit 8 controls the selector switch SW so that the transmit wave W21 is transmitted from the antenna A2 on channel ch2 for the duration of the transmit period T1 and the reflected wave W22 from the target T is received by the antenna A1 on channel ch1 for the duration of the receive period R1, and so that the transmit wave W11 is transmitted from the antenna A1 for the duration of the transmit period T2 and the reflected wave W12 is received by the antenna A2 for the duration of the receive period R2.

In this way, the transmit period T1, receive period R1, transmit period T2, and receive period R2 constitute one cycle of transmission/reception timing, and the path when receiving on channel ch1 and the path when receiving on channel ch2 share the same spatial system for the two transmission/reception periods. This cycle is repeated a plurality of times in the illustrated portion of the one upsweep section of the triangular frequency modulation signal.

In the transmission/reception timing example shown in FIG. 5, as the transmission and reception in the transmit period T1 and receive period R1 and the transmission and reception in the transmit period T2 and receive period R2 are switched from one to the other in rapid succession, the space intervening between the target and the radar apparatus remains almost unchanged, and all the received signals thus share the characteristics of the same spatial system. Accordingly, the processing system for the received signals is the same, and the respective received signals have the same characteristics in terms of frequency and phase.

Next, based on the received signal waveforms shown in FIGS. 6A to 6C, a conceptual description will be given of how the received signal changes according to the transmission/reception timing method shown in FIG. 5. In part (a) of FIG. 6A, the waveform of the received signal when the signal is transmitted from channel ch2 and received on channel ch1 is shown as "ch1" indicated by a thick line, while the waveform of the received signal when the signal is transmitted from channel ch1 and received on channel ch2 is shown as "ch2" indicated by a thin line. These waveforms each exemplify the output signal of the band-pass filter 6 in the radar apparatus shown in FIG. 1.

Here, if the antennas A1 and A2 have the same receiving performance, the received signal "ch1" from the antenna A1 and the received signal "ch2" from the antenna A2 are identical in waveform, so that the envelopes of the waveforms "ch1" and "ch2" coincide with each other, as shown in part (b) of FIG. 6A. However, if there is a performance difference between the antennas A1 and A2, the received signal "ch1" from the antenna A1 and the received signal "ch2" from the antenna A2 have waveforms that differ in both amplitude and phase as shown in part (a) of FIG. 6A.

In part (a) of FIG. 6A, the waveforms of the received signals "ch1" and "ch2" are shown only in schematic form; to explain the details of the waveforms, a portion of the waveforms of the received signals "ch1" and "ch2" shown in part (a) of FIG. 6A is shown in enlarged form in FIG. 6B. The waveforms of the received signals "ch1" and "ch2" are actually a signal train of pulses separated by a spacing corresponding to the transmit period, because the transmission and reception is repeated with the transmit period T1, receive period R1, transmit period T2, and receive period R2 as one cycle as shown in FIG. 5.

When the waveforms of the received signals "ch1" and "ch2" are viewed in time series, and when a radiowave is transmitted from channel ch2 in the transmit period T1, in the receive period R1 a pulse-like waveform of the received signal "ch1" appears on channel ch1, and when a radiowave is transmitted from channel ch1 in the transmit period T2, in the ensuing receive period R2 a pulse-like waveform of the received signal "ch2" appears on channel ch2. Thereafter, the pulse-like waveform of the received signal "ch1" and the pulse-like waveform of the received signal "ch2" repeatedly appear in alternating fashion, thus forming a signal train of pulses.

When the correction such as shown in FIG. 4 is applied to the received signals "ch1" and "ch2" forming such a signal train, if there is a performance difference between the antennas A1 and A2 the received signals "ch1" and "ch2" are corrected for amplitude and phase in signal processing so that the received signals both have the same characteristics. As shown in part (b) of FIG. 6A, the waveforms of the received signals "ch1" and "ch2" coincide with each other. A portion of the received signal waveform shown in part (b) of FIG. 6A is shown in enlarged form in FIG. 6C. In this figure, the pulse-like waveforms of the respective received signals appear in a similar manner to that shown in FIG. 6B.

In this way, according to the transmission/reception timing method shown in FIG. 5, as the received signal pulses are separated only by a spacing corresponding to the transmit period, the space intervening between the target and the radar apparatus remains almost unchanged, and all the received signals thus share the characteristics of the same spatial system. Accordingly, the processing system for the received signals is the same, and the respective received signals have the same characteristics in terms of frequency and phase. Further, as the processing is done at almost the same time, the reliability for phase alignment increases, and even when the vehicle is traveling, the correction process can be performed with good accuracy, and any abnormality occurring in the antenna characteristics can be judged accurately.

The above has described how the received signal characteristic judging unit 8 judges a change in the received signal characteristic, and how a correction is applied when a change in the characteristic is detected. Next, a description will be given of when the received signal characteristic change judging process is performed.

The received signal characteristic change judging process may be performed as needed by sending a processing instruction to the received signal characteristic judging unit 8 from outside the radar apparatus. For example, at the factory, an operator can issue the instruction in order to ensure uniform product quality at the time of product inspection before shipment. Further, at a car maker, the processing instruction can be issued to inspect the radar apparatus and correct or enhance the accuracy of target recognition.

On the other hand, in applications where the radar apparatus is mounted on a vehicle and used when the vehicle is traveling, provisions may be made to issue the processing instruction intermittently and automatically, as shown in FIG. 7, to perform correction as needed during the usual recognition process being performed in the radar apparatus.

Figure 8:
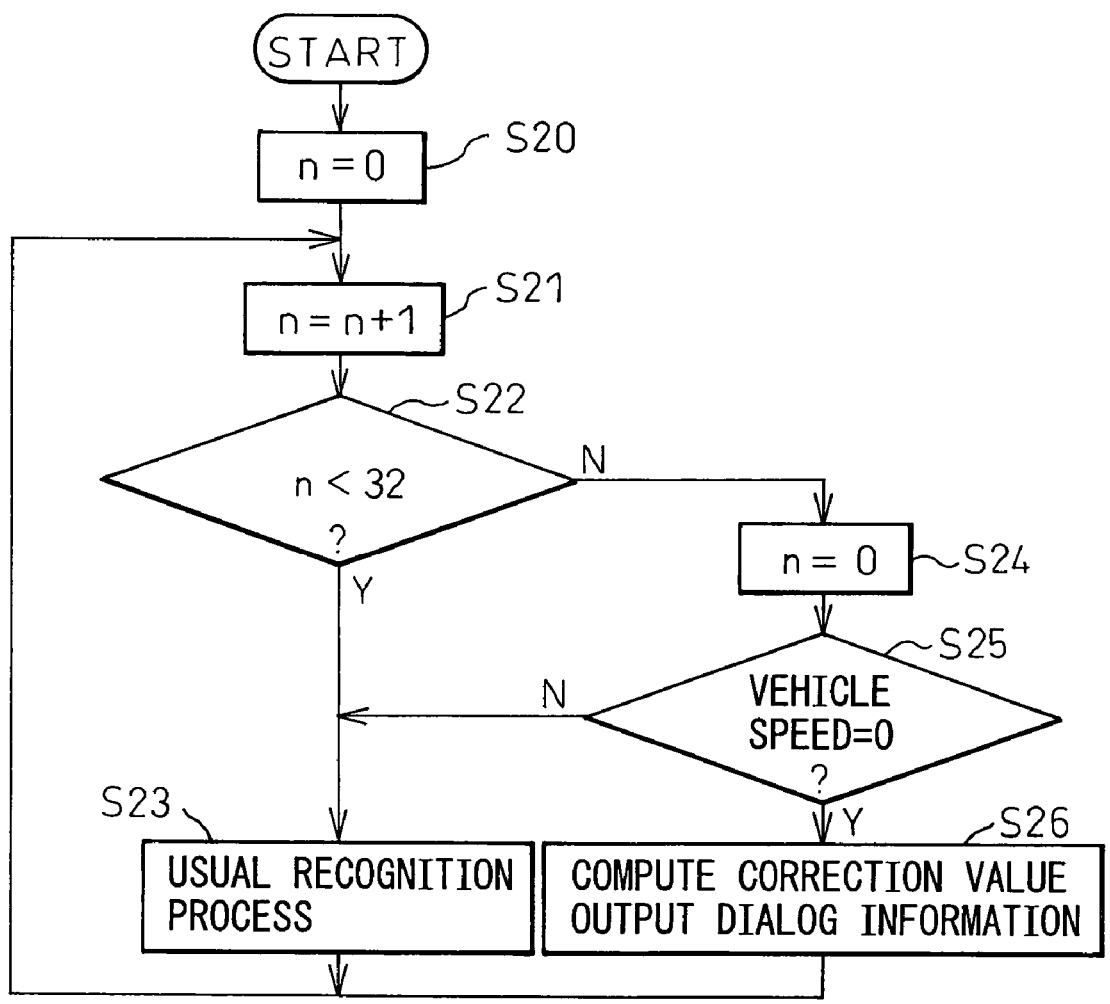
FIG. 8 is a flowchart for explaining a procedure when performing the processing with the timing shown in FIG. 7.

FIG. 7 is a time chart showing how the correction operation is performed once for every predetermined number of the usual recognition processing cycles. FIG. 8 shows in flowchart form the procedure for performing the correction operation in the received signal characteristic judging unit 8.

The received signal characteristic judging unit 8 includes a counter for counting the number of processing cycles performed. When the operation of the radar apparatus is started, the counter value is set at its initial value 0 (n=0) (step S20). Then, the counter is incremented by 1 (n=n+1) for each processing cycle (step S21). In the example shown in FIG. 8, the signal processing unit 7 is set up to perform the correction operation once for every 32 cycles, and the counter value is checked to see if the number of processing cycles exceeds 32 (step S22).

If the counter value n indicating the number of processing cycles is less than 32 (Y in step S22), the signal processing unit 7 continues to perform the usual recognition process (step S23). When the counter value n indicating the number of processing cycles reaches 32 (N in step S22), the counter is reset to its initial value 0 (step S24).

Then, it is determined whether the vehicle is stationary or not (step S25). If the vehicle speed detected from the vehicle's speedometer or the like is not zero, that is, if the vehicle is moving (N in step S25), the process proceeds to step S23 to continue to perform the usual recognition process.

On the other hand, if the vehicle is stationary, and the vehicle speed is therefore zero (Y in step S25), the correction value is computed in accordance with the processing procedure shown in the flowchart of FIG. 4, and the correction operation is performed to retain the correction value or update the correction value (step S26). Further, if the computed correction value is outside the predetermined range, dialog information is output.

In the processing procedure shown in FIG. 8, the correction operation is performed only when the vehicle is stationary; that is, when the vehicle is stopped, as the range to the target located ahead of the vehicle is fixed, the input of the received signal is stable and an improvement in the accuracy of the correction operation can therefore be expected. It will, however, be appreciated that the object of the present invention can be achieved if the correction operation is simply performed periodically, once for every predetermined number of processing cycles, regardless of whether the vehicle is stationary or not.

Further, in the processing procedure shown in FIG. 8, when the vehicle is stationary, that is, when the input of the received signal is stable, the characteristic change judging process is performed; then, the process may be performed regardless of whether the vehicle is stationary or not, that is, even when the vehicle is moving, provided that the relative range to the target located ahead of the vehicle is stable or that the reception level is high.

In that case, the received signal characteristic change judging process may be performed by detecting that the relative range being measured is constant and not changing in the usual recognition process performed in the signal processing unit 7. Further, when a plurality of targets are detected ahead of the vehicle, if the correction operation is performed by selecting the received signal relating to the target whose relative range is the shortest, the accuracy of the correction can be enhanced.

Figure 9:
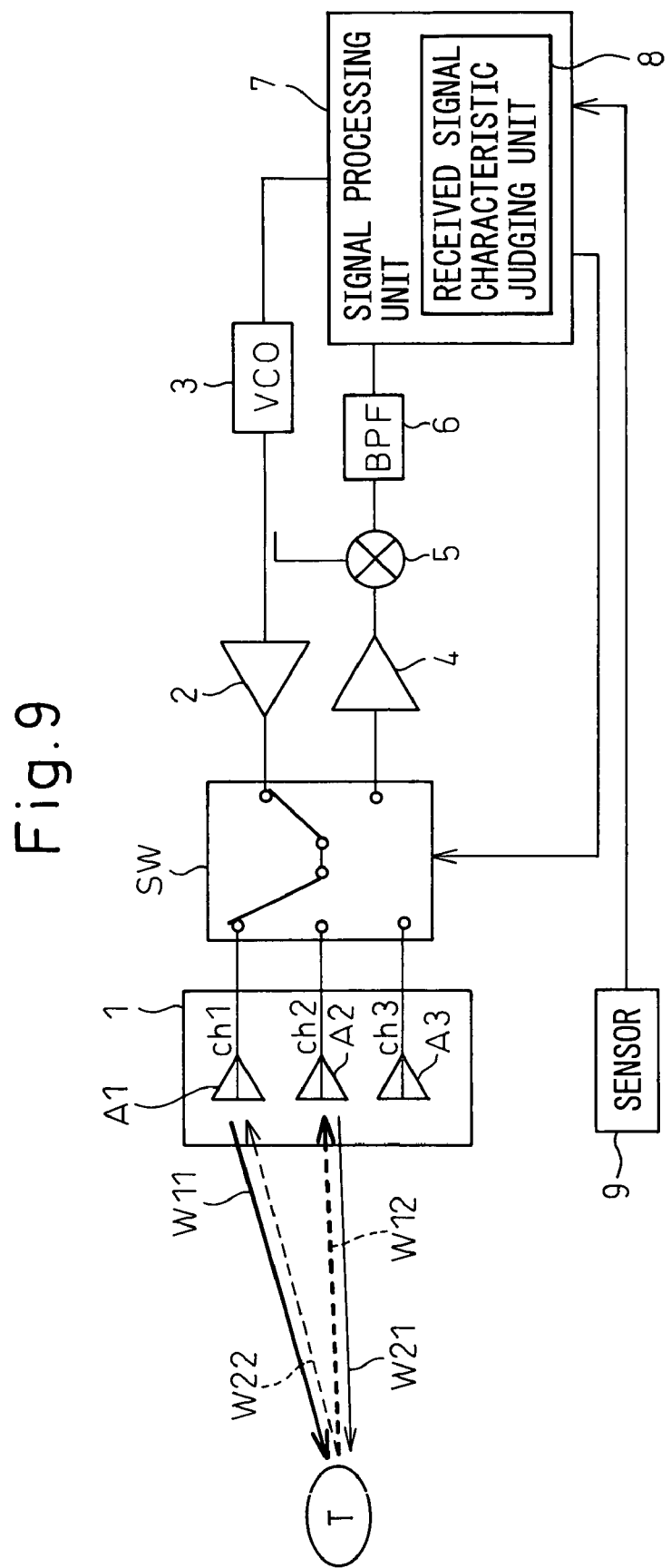
FIG. 9 is a diagram for explaining the system configuration of a radar apparatus according to another embodiment of the present invention.

The received signal characteristic change judging process described above is performed at predetermined intervals of time but, alternatively, as shown in FIG. 9, the received signal characteristic change judging process may be performed when a change is detected in the temperature relating to the array antenna of the radar apparatus. The system configuration of the radar apparatus shown in FIG. 9 is essentially the same as that of the radar apparatus of FIG. 1; therefore, the same parts are designated by the same reference numerals, and the system configuration itself and its operation will not be described here.

The radar apparatus shown in FIG. 9 differs from that shown in FIG. 1 in that a sensor 9 is attached directly to, or provided in the vicinity of, the array antenna 1. The sensor 9 is a temperature sensor for sensing the ambient temperature of the antenna array 1. The performance and the receiving characteristics of the plurality of antennas forming the array antenna 1 change when the antennas are subjected to temperature changes, and the degree of the change varies between antennas.

For this reason, the received signal characteristic judging unit 8, based on the temperature information supplied from the sensor 9, performs the received signal characteristic change judging process, for example, when the detected temperature is outside a predetermined range. By detecting the temperature information in this way, the correction operation is performed accurately as the environment of the radar apparatus changes. When the correction operation responding to a change in the environment is combined with the earlier described intermittent correction operation, the accuracy of the correction can be further enhanced.

In addition to the above, the input level of the received signal is monitored during the usual recognition process in the signal processing unit 7. For example, provisions may be made to perform the received signal characteristic change judging process in the event of the occurrence of a violent change that would never be encountered in the normal recognition process. In this case, an abrupt fault of any one of the antennas can be automatically detected, and a notification can be reliably output to indicate that the recognition by the radar apparatus is incorrect.

What is claimed is:

1. A radar apparatus comprising:
    a plurality of antennas, each switchable between transmission and reception; and
    a signal processing unit for receiving a reflected wave of a transmitted radiowave reflected from a target object, and for generating a processing signal based on the received signal and thereby performing a recognition process which involves detecting an azimuth relating to the reflected wave or measuring a range or velocity relating to the target object, wherein when a reflected wave of a radiowave transmitted from a first selected one of the antennas is received by a second selected antenna, the signal processing unit generates a first processing signal based on the received signal, and when a reflected wave of a radiowave transmitted from the second selected antenna is received by the first selected antenna, the signal processing unit generates a second processing signal based on the received signal, and compares the first processing signal with the second processing signal and thereby makes a judgment about a change in a characteristic of the received signal based on an amplitude difference and/or a phase difference between the two processing signals.

2. A radar apparatus as claimed in claim 1, wherein the signal processing unit selects two antennas at a time from among the plurality of antennas, generates the first processing signal and the second processing signal relating to the two antennas each time the selection is made, and makes a judgment about a change in the characteristic of the received signal each time two antennas are selected.

3. A radar apparatus as claimed in claim 1, wherein, when it is judged that there exists a change in the characteristic of the received signal, the signal processing unit corrects the first processing signal or the second processing signal based on a correction value computed in accordance with the change.

4. A radar apparatus as claimed in claim 1, wherein the signal processing unit makes a judgment about a change in the characteristic of the received signal when a temperature change has occurred in an operating environment.

5. A radar apparatus as claimed in claim 1, wherein the signal processing unit makes a judgment about a change in the characteristic of the received signal in an intermittent manner during execution of the recognition process involving the azimuth detection and the range or velocity measurement.

6. A radar apparatus as claimed in claim 1 wherein, during one period of a frequency modulation signal in the radiowave, the signal processing unit causes the second selected antenna to receive the reflected wave of the radiowave transmitted from the first selected antenna and generates the first processing signal based on the received signal, and during another period of the frequency modulation signal, the signal processing unit causes the first selected antenna to receive the reflected wave of the radiowave transmitted from the second selected antenna, generates the second processing signal based on the received signal, and compares the first processing signal with the second processing signal and thereby makes a judgment about a change in the characteristic of the received signal.

7. A radar apparatus as claimed in claim 1, wherein the signal processing unit divides one period of a frequency modulation signal in the radiowave into a plurality of sections in time division fashion, and wherein, in each section, the signal processing unit causes the second selected antenna to receive the reflected wave of the radiowave transmitted from the first selected antenna and generates the first processing signal based on the received signal, and then causes the first selected antenna to receive the reflected wave of the radiowave transmitted from the second selected antenna, generates the second processing signal based on the received signal, and compares the first processing signal with the second processing signal and thereby makes a judgment about a change in the characteristic of the received signal.

8. A radar apparatus as claimed in claim 1, wherein when the range relative to the target object remains unchanged, the signal processing unit makes a judgment about a change in the characteristic of the received signal.

9. A radar apparatus as claimed in claim 8, wherein, when a vehicle equipped with the radar apparatus is detected as being stationary, the signal processing unit makes a judgment about a change in the characteristic of the received signal.

10. A radar apparatus as claimed in claim 1, wherein, when the received signal has a level higher than a predetermined value or lying within a predetermined range, the signal processing unit makes a judgment about a change in the characteristic of the received signal.

11. A radar apparatus as claimed in claim 3, wherein the signal processing unit stores the computed correction value in association with the receiving antenna, and performs the recognition process in accordance of the processing signal generated based on the received signal received by the receiving antenna and corrected by the correction value.

12. A radar apparatus as claimed in claim 7, wherein when a plurality of target objects are detected, and the signal processing unit makes a judgment about a change in the characteristic of the received signal, based on the first and the second processing signal generated from the received signals representing the reflected waves returned from the target object located closest to the radar apparatus.

13. A radar apparatus as claimed in claim 1, wherein the signal processing unit makes a judgment about a change in the characteristic of the received signal in response to an external instruction.

14. A radar apparatus as claimed in claim 11, wherein the signal processing unit makes a judgment about a change in the characteristic of the received signal as an initial adjustment of the radar apparatus and, if the presence of a change in the characteristic is detected, then stores the computed correction value in association with the receiving antenna.

15. A radar apparatus as claimed in claim 1, wherein the signal processing unit outputs a notification outside the radar apparatus when it is judged that there exists a change in the characteristic of the received signal.

16. A radar apparatus as claimed in claim 15, wherein when it is judged that there exists a change in the characteristic of the received signal, if the change in the characteristic is not within a predetermined range, the signal processing unit outputs dialog information outside the radar apparatus.

17. A radar apparatus as claimed in claim 1, wherein the signal processing unit generates the first processing signal by performing a fast Fourier transform after converting the received signal received by the second selected antenna into a digital signal, generates the second processing signal by performing a fast Fourier transform after converting the received signal received by the first selected antenna into a digital signal, and compares frequency components corresponding to the target object and contained in the first processing signal and the second processing signal, respectively, to make a judgment about a change in the characteristic of the received signal based on an amount of amplitude difference and/or phase difference between the frequency components.

18. A radar apparatus as claimed in claim 17, wherein, when it is judged that there exists a change in the characteristic of the received signal, the signal processing unit corrects the first processing signal or the second processing signal based on a correction value computed in accordance with the change.

* * * * *